US008018510B2

(12) United States Patent
Murata et al.

(10) Patent No.: US 8,018,510 B2
(45) Date of Patent: Sep. 13, 2011

(54) SUMMING SIGNALS IN PIXEL UNITS OF SOLID-STATE IMAGER

(75) Inventors: Takahiko Murata, Osaka (JP); Takumi Yamaguchi, Kyoto (JP); Shigetaka Kasuga, Osaka (JP)

(73) Assignee: Panasonic Corporation, Osaka (JP)

( * ) Notice: Subject to any disclaimer, the term of this patent is extended or adjusted under 35 U.S.C. 154(b) by 918 days.

(21) Appl. No.: 11/569,603

(22) PCT Filed: Feb. 25, 2005

(86) PCT No.: PCT/JP2005/003162
§ 371 (c)(1),
(2), (4) Date: Nov. 27, 2006

(87) PCT Pub. No.: WO2005/117420
PCT Pub. Date: Dec. 8, 2005

(65) Prior Publication Data
US 2007/0222867 A1    Sep. 27, 2007

(30) Foreign Application Priority Data

May 31, 2004    (JP) ................................ 2004-162629

(51) Int. Cl.
H04N 5/335    (2011.01)
(52) U.S. Cl. ...................................... 348/294
(58) Field of Classification Search .................. 348/394, 348/294
See application file for complete search history.

(56) References Cited

U.S. PATENT DOCUMENTS

| | | | |
|---|---|---|---|
| 3,971,065 A * | 7/1976 | Bayer | 348/276 |
| 5,705,807 A | 1/1998 | Throngnumchai et al. | |
| 5,933,188 A | 8/1999 | Shinohara et al. | |
| 5,949,483 A * | 9/1999 | Fossum et al. | 348/303 |
| 6,483,541 B1 | 11/2002 | Yonemoto et al. | |
| 6,693,670 B1 * | 2/2004 | Stark | 348/308 |
| 6,730,898 B2 * | 5/2004 | Machida | 250/208.1 |
| 6,992,714 B1 | 1/2006 | Hashimoto et al. | |
| 7,319,218 B2 * | 1/2008 | Krymski | 250/208.1 |

(Continued)

FOREIGN PATENT DOCUMENTS

GB    2318473    4/1998

(Continued)

OTHER PUBLICATIONS

English Language Abstract of JP 10-145681, May 29, 1998.

(Continued)

*Primary Examiner* — Jason Chan
*Assistant Examiner* — Gary Vieaux
(74) *Attorney, Agent, or Firm* — Greenstein & Bernstein, P.L.C.

(57) ABSTRACT

A solid-state imaging device is provided in which sensitivity is prevented from lowering even when signals of pixels are mixed. The solid-state imaging device includes a plurality of pixel units each of which has a photoelectric conversion element, and is capable of summing signals corresponding to respective outputs of the photoelectric conversion elements of the pixel units. The device includes: a plurality of capacitors, each of which individually accumulates electric charges corresponding to a signal outputted from the associated photoelectric conversion element; and a plurality of MOS transistors which are alternately connected with the associated capacitor. By disconnecting the MOS transistor, the electric charges of the signal outputted from each of the photoelectric conversion elements are accumulated in each associated capacitor, and by conducting the MOS transistors to sum the signals of the pixel units, the capacitors are connected in series.

6 Claims, 14 Drawing Sheets

U.S. PATENT DOCUMENTS

| | | | |
|---|---|---|---|
| 7,626,624 B2 * | 12/2009 | Fraenkel et al. | 348/308 |
| 2002/0186312 A1 * | 12/2002 | Stark | 348/302 |
| 2003/0183829 A1 * | 10/2003 | Yamaguchi et al. | 257/88 |
| 2006/0102827 A1 | 5/2006 | Kasuga et al. | |
| 2006/0278948 A1 | 12/2006 | Yamaguchi et al. | |

FOREIGN PATENT DOCUMENTS

| | | |
|---|---|---|
| JP | 62-022459 | 5/1987 |
| JP | 8-116491 | 5/1996 |
| JP | 8-122149 | 5/1996 |
| JP | 9-46597 | 2/1997 |
| JP | 9-247544 | 9/1997 |
| JP | 10-13746 | 1/1998 |
| JP | 10-145681 | 5/1998 |
| JP | 10145681 A * | 5/1998 |
| JP | 2000-152086 | 5/2000 |
| JP | 2001-292453 | 10/2001 |
| JP | 2002-165132 | 6/2002 |
| JP | 2003-169257 | 6/2003 |

OTHER PUBLICATIONS

English Language Abstract of JP 9-247544, Sep. 19, 1997.
English Language Abstract and English Language Translation of JP 55-132069 (published Oct. 14, 1980).
English Language Abstract of JP 2001-292453, Oct. 19, 2001.
English Language Abstract of JP 8-116491, May 7, 1996.
English Language Abstract of JP 8-122149, May 17, 1996.
English Language Abstract of JP 2003-169257, Jun. 13, 2003.
English Language Abstract of JP 2000-152086, May 30, 2000.

* cited by examiner

SUMMING SIGNALS IN PIXEL UNITS OF SOLID-STATE IMAGER

TECHNICAL FIELD

The present invention relates to a metal-oxide-semiconductor (MOS) solid-state imaging device used in a digital camera or the like, and particularly to a technique effective for summing signals of plural pixels.

BACKGROUND ART

In recent years, solid-state imaging devices have been developed to have increased number of pixels up to five million pixels or the like, enabling to capture still pictures like silver salt pictures and to capture moving pictures. When capturing moving pictures, several hundred thousand pixels are used for capturing, so in order to effectively utilize the extra photoelectric conversion elements, a means for mixing signals of respective photoelectric conversion elements of pixels is adopted generally (for example, refer to Patent Reference 1).

FIG. 1 is a diagram showing the configuration of a signal readout circuit of a conventional solid-state imaging device.

As shown in FIG. 1, a signal readout circuit includes memories (hereinafter, referred to also as capacitors or accumulation circuits) 101, 102, 103 and 104 for accumulating signals from the respective pixels of the solid-state imaging device respectively, and MOS transistors 105, 106, 107 and 108, and the like.

The MOS transistors 105, 106, 107 and 108 are conducted when a high-level signal is applied to the respective gates of these MOS transistors, thereby causing the memories 101, 102, 103 and 104 to be in a state of being connected in parallel, and an average of the signals from the pixels accumulated in the memories 101, 102, 103 and 104 is outputted to a signal output line 109.

Patent Reference 1: Japanese Patent Application Laid-Open No. 2001-292453 (pp. 1-11, FIG. 4)

DISCLOSURE OF INVENTION

Problems that Invention is to Solve

However, since the conventional solid-state imaging device mixes signals of pixels, by averaging the signals by connecting the memories accumulating pixel signals in parallel, signals of plural signals are not summed but an average value of the pixel signals is outputted. In the case of a still-picture mode, since each of the photoelectric conversion elements is read individually, the accumulating time period becomes longer, the light amount also becomes larger, and the output signals become higher. However, in the case of a moving-picture mode, signals of photoelectric conversion elements are mixed at a high speed for each frame, so the number of effective photoelectric conversion elements decreases, whereby the accumulating time period becomes shorter practically. Therefore, in the conventional solid-state imaging device, output signal values will not be summed as the light amount decreases, so the output signal value becomes smaller in proportion to the shortened accumulating time period, which causes lowering of sensitivity.

It is an object of the present invention to provide a solid-state imaging device and a camera in which sensitivity is prevented from lowering even when signals of pixels are mixed.

Means to Solve the Problems

In order to achieve the above object, the solid-state imaging device according to the present invention has a plurality of pixel units each of which includes a photoelectric conversion element. The solid-state imaging device includes: a plurality of accumulation circuits, each of which individually accumulates electric charges corresponding to a signal outputted from the photoelectric conversion element associated with the accumulation circuit; and a plurality of switch circuits which are connected in turn with the accumulation circuit associated with each of the switch circuits, wherein, by disconnecting each of the switch circuits, the electric charges corresponding to the signal outputted from each of the photoelectric conversion elements are accumulated in the associated accumulation circuit, and by conducting the plurality of the switch circuits to sum the respective signals of the pixel units, the plurality of the accumulation circuits are connected in series.

Thereby, sensitivity can be improved by summing voltages corresponding to the outputs of the respective accumulation circuits.

Further, the solid-state imaging device may further include: a signal output line which retrieves the summed signals, from a latter stage of each of the accumulation circuits connected in series; and a high input impedance circuit, arranged at the latter stage of each of the accumulation circuits, which outputs the summed signals to the signal output line.

Thereby, even if a diffusion capacitor is formed in the signal output line, it is possible to prevent lowering of a sum of voltage values due to the diffusion capacitor.

Furthermore, the high input impedance circuit may be one of a follower circuit and an inverter circuit.

Thereby, a high input impedance circuit can be configured easily.

Still further, an input of the follower circuit and the inverter circuit may be one of a gate of a MOS transistor and a base of a bipolar transistor.

Thereby, high input impedance can be realized easily.

Still further, the accumulation circuits may be (N+1), where N is a positive integer, capacitors, and the switch circuits may be (N+1) MOS transistors, and a connecting structure of the circuits may be: one terminal of an Nth MOS transistor is connected with a terminal which is in an Nth capacitor and near to the photoelectric conversion element, and the other terminal of the Nth MOS transistor is connected to a terminal which is in an (N+1)th capacitor and far from the photoelectric conversion element; one terminal of an (N+1)th MOS transistor is connected to a terminal which is in the (N+1)th capacitor and near to the photoelectric conversion element; and a value obtained by summing the respective voltages accumulated in the capacitors is outputted from the other terminal of the (N+1)th MOS transistor.

Thereby, circuits in which the respective capacitors are connected in series can be configured easily.

Still further, each of the capacitors may clamp the electric charges, every time period for each frame for which each of the MOS transistors is disconnected, after setting the same electric potential to both terminals of the capacitor.

Thereby, an offset is eliminated, so it is possible to enlarge a dynamic range and sum the voltages up to a high output.

Still further, the switch circuits may connect a plurality of the accumulation circuits in series, the accumulation circuits associated with the respective photoelectric conversion elements which are arranged in a row direction.

Thereby, it is possible to sum signals of pixels in a row direction easily, thereby realizing image compression in a row direction.

Still further, the switch circuits may connect a plurality of the accumulation circuits in series, the accumulation circuits associated with the respective photoelectric conversion elements which are arranged in a column direction.

Thereby, it is possible to sum signals of pixels in a column direction easily, thereby realizing image compression in a column direction.

Still further, the switch circuits may connect a plurality of the accumulation circuits in series simultaneously, the accumulation circuits associated with the respective photoelectric conversion elements which are arranged in a column direction and in a column direction.

Thereby, it is possible to sum signals of pixels in a row direction and a column direction at the same time, thereby processing moving pictures and the like.

Still further, the pixel unit may have a color filter, and the switch circuits may connect a plurality of the accumulation circuits in series, the accumulation circuits associated with the respective photoelectric conversion elements which have filters of the same color.

Still further, the color filter may be in a Bayer pattern.

Thereby, excellent color reproduction can be made.

Note that the present invention is not only realized as such a solid-state imaging device but also realized as a camera including such a solid-state imaging device.

Thereby, it is possible to realize a camera which realizes image compression and moving picture processing by combining signals of pixels in a row direction and a column direction, and realizes excellent color reproduction.

Effects of the Invention

As described above, according to the solid state imaging device of the present invention, it is possible to sum signals of pixels (hereinafter, referred to also as "pixel summing") and outputted. Thereby, compared with a still-picture mode, the output signal value can be increased more than conventional case even if the accumulating time period becomes shorter and the light amount becomes smaller. Accordingly, even in a moving-picture mode, sensitivity can be prevented from lowering, Further, it is also possible to sum signals of pixels regarding the same color and output them.

Accordingly, by the present invention, a higher picture quality of a captured image can be possible. Thereby, the practical value of the present invention is extremely high nowadays that digital cameras and portable telephones incorporating solid-state imaging devices have been widely used.

NUMERICAL REFERENCES

| | |
|---|---|
| 1, 2, 3, 4 | Solid-state imaging device |
| 11a, 11b, 30a, 30b, 50a, 50b, 50c, 50d | Pixel unit |
| 13 | High input impedance circuit |
| 31 | Buffer |
| 81 | Pixel summing unit |
| 89, 92 | Bipolar transistor |
| 90, 91 | Resistance |
| C2a, C2b, C3a, C3b, C3c, C3d | Capacitor |
| Q4a, Q4b, Q12a, Q12b, Q12c, Q12d | MOS transistor |
| 85, 86, 87, 88 | MOS transistor |
| L1, L2, L3 | signal output line |

BEST MODE FOR CARRYING OUT THE INVENTION

The following describes embodiments of the present invention with reference to the drawings.

First Embodiment

Figure 1:
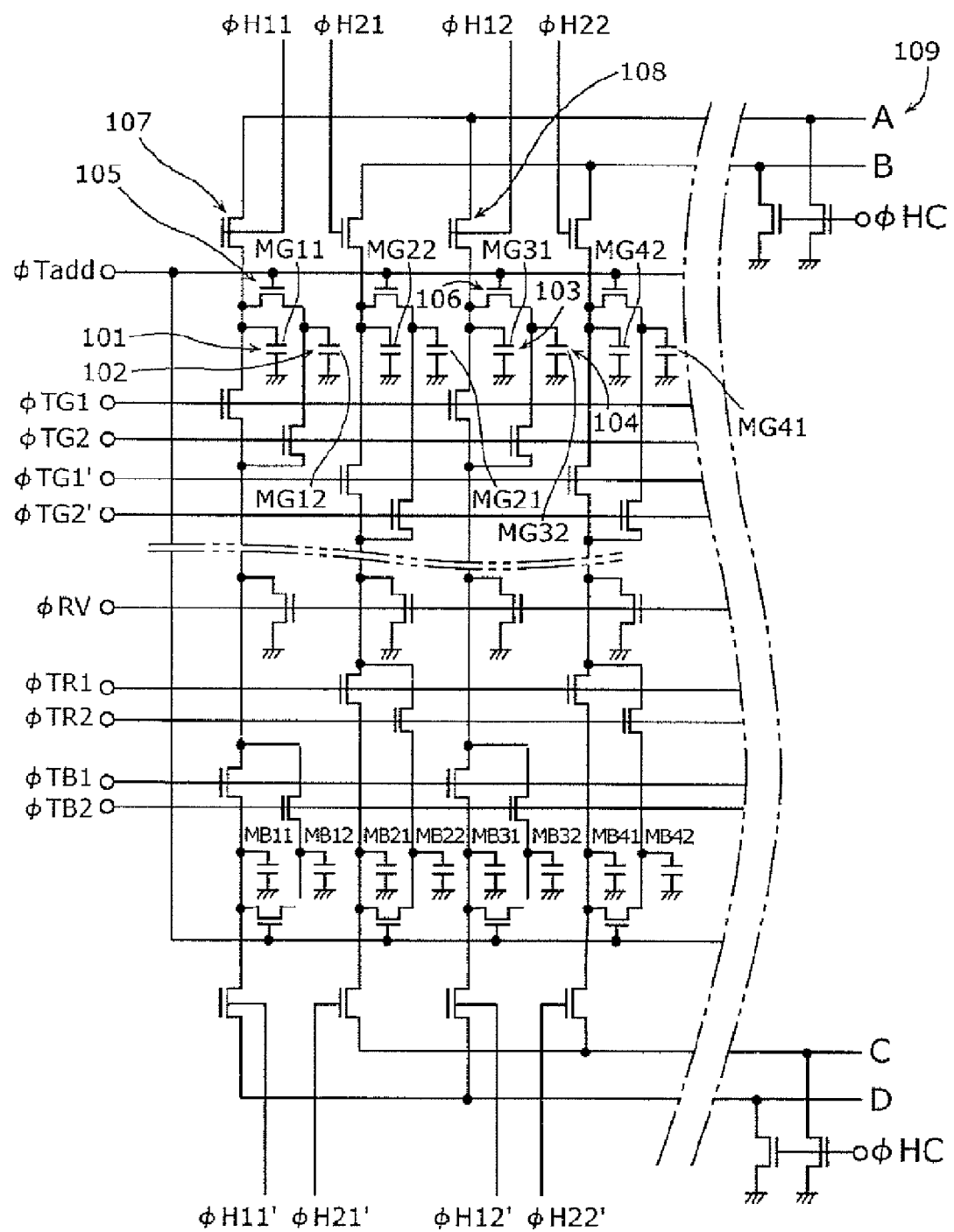
FIG. 1 is a signal readout circuit configuration diagram of a conventional solid-state imaging device.
Figure 2:
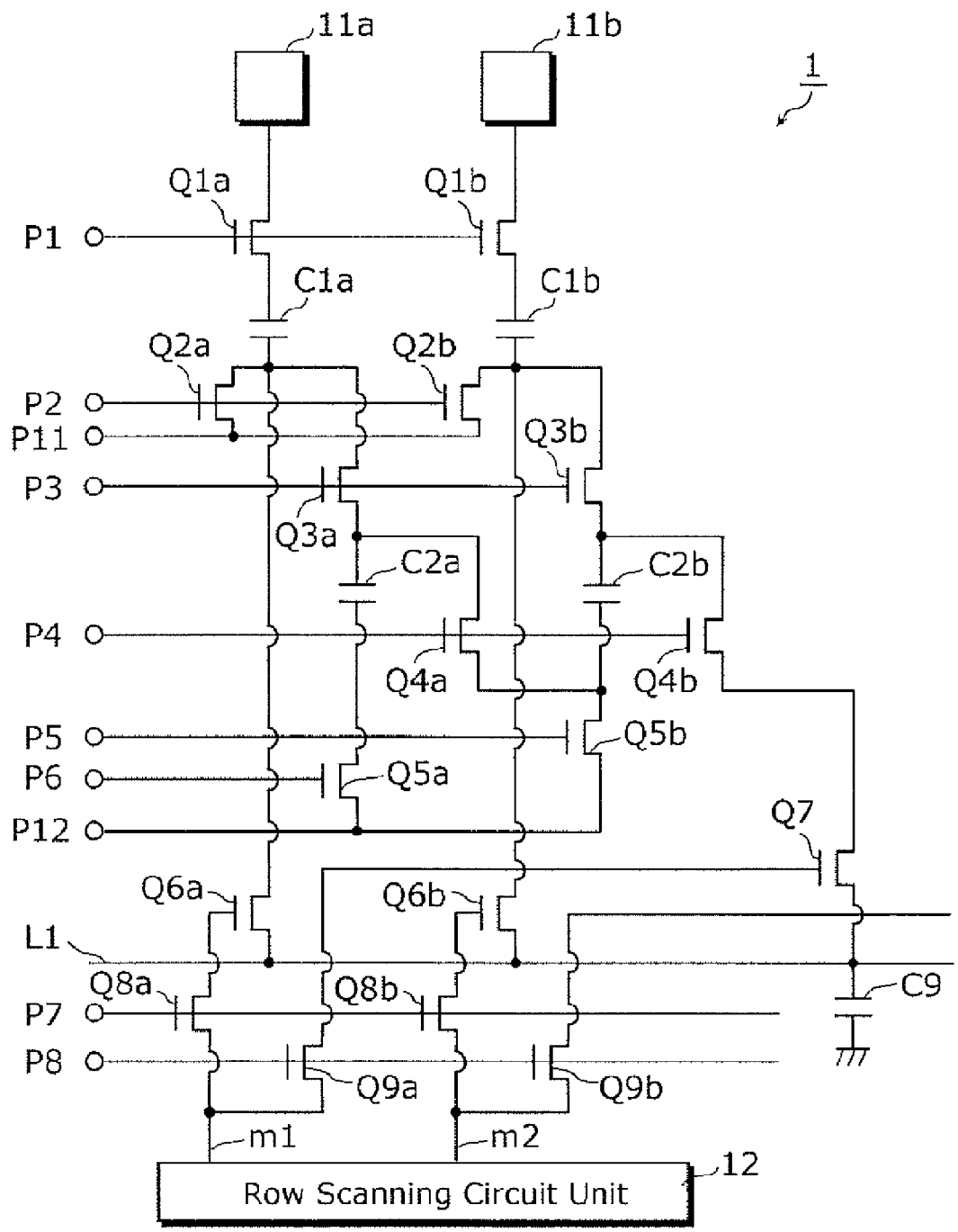
FIG. 2 is a diagram showing the circuit configuration of a solid-state imaging device according to a first embodiment.

FIG. 2 is a diagram showing the circuit configuration of a solid-state imaging device according to the first embodiment of the present invention. In this example, the case where two pixel units (photoelectric conversion elements) are arranged in a row direction is shown.

As shown in FIG. 2, the solid-state imaging device 1 includes: pixel units 11a and 11b; a plurality of MOS transistors Q1a, Q1b, Q2a, Q2b, Q3a, Q3b, Q4a, Q4b, Q5a, Q5b, Q6a, Q6b, Q7, Q8a, Q8b, Q9a and Q9b; a plurality of capacitors C1a, C1b, C2a and C2b; a row scanning circuit unit (row-selection scanning circuit unit) 12; drive pulse supply terminals P1, P2, P3, P4, P5, P6, P7 and P8 to which drive pulses are applied from a column scanning circuit unit and a signal readout circuit unit that are not shown in the figure; bias supply terminals P11 and P12 to which bias voltages are applied from the column scanning circuit unit and the signal readout circuit unit; a signal output line L1; and the like. In addition, a diffusion capacitor C9 is formed between the signal output line L1 and the ground.

Each of the pixel units 11a and 11b includes a photoelectric conversion element, an electric charge transfer unit, an electric charge voltage conversion unit, a voltage amplification unit and the like. Note that in FIG. 2, the detailed circuit configurations of the pixel unit 11a and 11b are not shown.

Each of the MOS transistors Q1a, Q1b, Q2a, Q2b, Q3a, Q3b, Q4a, Q4b, Q5a, Q5b, Q6a, Q6b, Q7, Q8a, Q8b, Q9a, and Q9b has a function of a switch circuit. That is, each MOS transistor Q1a, Q1b, Q2a, Q2b, Q3a, Q3b, Q4a, Q4b, Q5a, Q5b, Q6a, Q6b, Q7, Q8a, Q8b, Q9a, or Q9b becomes a conduction (hereinafter, referred to as also as "on") state, when a high-level signal is applied to a gate of each MOS transistor, and becomes a non-conduction (hereinafter, referred to also as "disconnection" or "off") state, when a low-level signal is applied.

The capacitor C1a and C1b transmit output voltages of the pixel unit 11a and 11b, respectively.

The capacitor C2a and C2b accumulate voltages corresponding to outputs of the pixel unit 11a and 11b, respectively.

The row scanning circuit unit 12 has signal output lines m1, m2, . . . , and when reading out electric charges accumulated in the capacitors C2a and C2b, the row scanning circuit unit 12 outputs scan signals from the signal output lines m1, m2, . . . in a row direction (horizontal direction).

Note that the elements with "a" in the reference numerals are in association with the pixel unit 11a, and the elements with "b" in the reference numerals are in association with the pixel unit b. The following is described mainly a series of elements with the "a".

The drain of the MOS transistor Q1a is connected with the pixel unit 11a, the source thereof is connected with the capacitor C1a, and the gate thereof is connected with the drive pulse supply terminal P1. The MOS transistor Q1b is connected in such a manner as described for the MOS transistor Q1a.

The drain of the MOS transistor Q2a is connected with the capacitor C1a, the source thereof is connected with the bias supply terminal P11, and the gate thereof is connected with the drive pulse supply terminal P2. The MOS transistor Q2b is connected in such a manner as described for the MOS transistor Q2a.

The drain of the MOS transistor Q3a is connected with the capacitor C1a, the source thereof is connected with the capacitor C2a, and the gate thereof is connected with the drive pulse supply terminal P3. The MOS transistor Q3b is connected in such a manner as described for the MOS transistor Q3a.

The drain of the MOS transistor Q5a is connected with the capacitor C2a, the source thereof is connected with the bias supply terminal P12, and the gate thereof is connected with the drive pulse supply terminal P6. On the other hand, the drain of the MOS transistor Q5b is connected with the capacitor C2b, the source thereof is connected with the bias supply terminal P12, and the gate thereof is connected with the drive pulse supply terminal P5.

The drain of the MOS transistor Q6a is connected with the capacitor C1a, the source thereof is connected with the signal output line L1, and the gate thereof is connected with the drain of the MOS transistor Q8a. The MOS transistor Q6b is connected in such a manner as described for the MOS transistor Q6a.

The drain of the MOS transistor Q4a is connected with a terminal of the capacitor C2a, where the terminal is near to the photoelectric conversion element. The source of the MOS transistor Q4a is connected with a terminal of the capacitor C2b, where the terminal is far from the photoelectric conversion element. The gate of the MOS transistor Q4a is connected with the drive pulse supply terminal P4. On the other hand, the drain of the MOS transistor Q4b is connected with a terminal of the capacitor C2b, where the terminal is near to the photoelectric conversion element. The source of the MOS transistor Q4b is connected with the drain of the MOS transistor Q7. The gate of the MOS transistor Q4b is connected with the drive pulse supply terminal P4.

The source of the MOS transistor Q7 is connected with the signal output line L1, and the gate thereof is connected with the drain of the MOS transistor Q9a.

The drain of the MOS transistor Q8a is connected with the gate of the MOS transistor Q6a, and the gate thereof is connected with the drive pulse supply terminal P7. The MOS transistor Q8b is connected in such a manner as described for the MOS transistor Q8a.

The gate of the MOS transistor Q9a is connected with the drive pulse supply terminal P8, and the drain thereof is connected with the gate of the MOS transistor Q7, as described above.

The gate of the MOS transistor Q9b is connected with the drive pulse supply terminal P8, and the drain thereof is connected with the gate of a MOS transistor (not shown in FIG. 2) that is equivalent to the MOS transistor Q7 in the next stage in a horizontal direction.

The signal output line m1 of the row scanning circuit unit 12 is connected with both of the source of the MOS transistor Q8a and the source of the MOS transistor Q9a, and the signal output line m2 is connected with both of the source of the MOS transistor Q8b and the source of the MOS transistor Q9b.

Next, a normal operation without summing signals of pixel units (pixel summing) in the solid-state imaging device 1, and an operation with the pixel summing, are sequentially described below.

Firstly, a description is given for the normal operation without the pixel summing.

Figure 3:
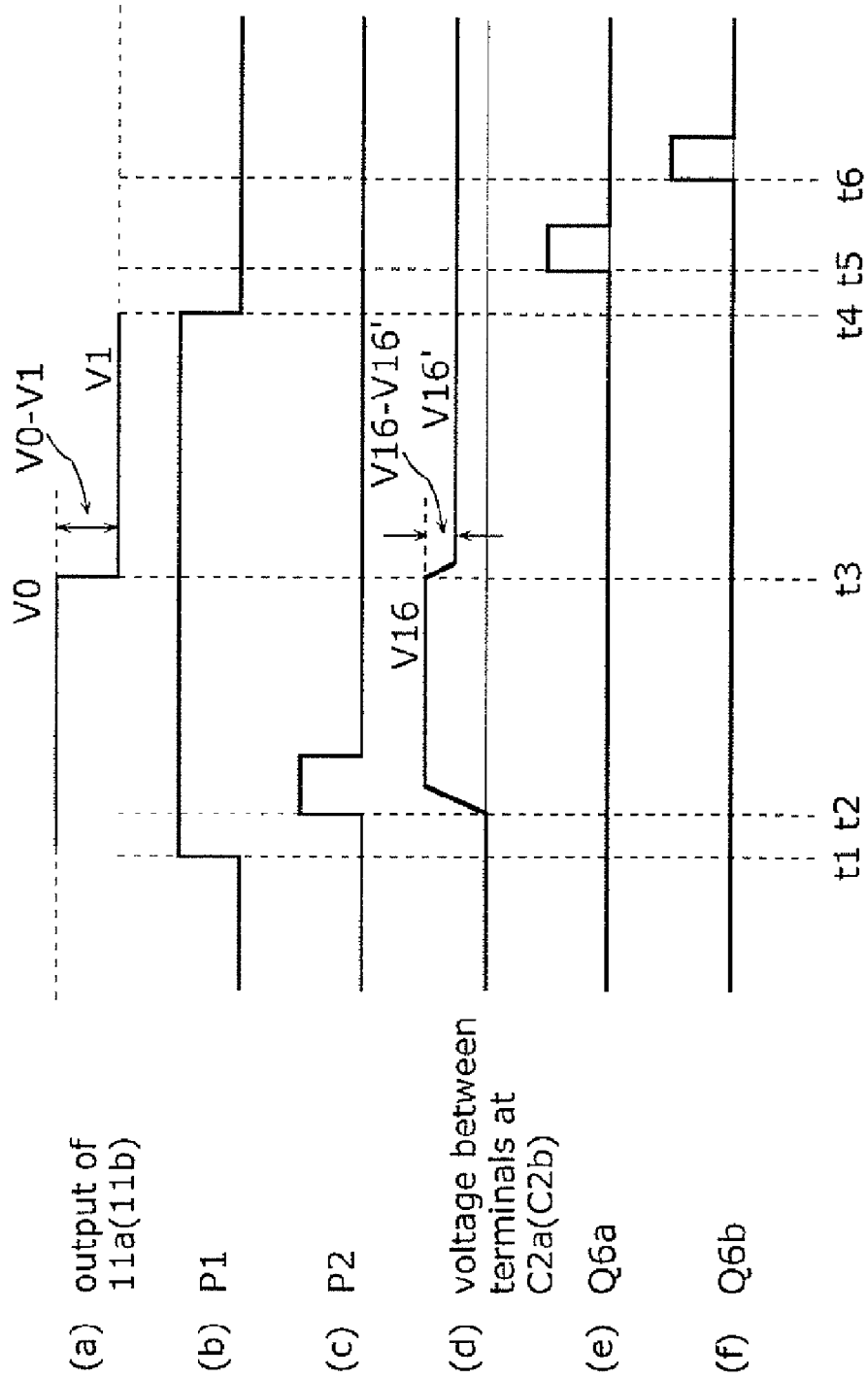
FIG. 3 is a diagram showing timings in the case of normal operation by the solid-state imaging device 1 shown in FIG. 2.

FIG. 3 is a diagram showing timings in the case of the normal operation by the solid-state imaging device 1 shown in FIG. 2.

Firstly, as preprocessing, for each frame, prior to a time t1, a high-level signal is applied to the drive pulse supply terminals P2, P3, P5 and P6 thereby turning on the MOS transistors Q2a, Q2b, Q3a, Q3b, Q5a and Q5b, a low-level signal is applied to the drive pulse supply terminal P4 thereby turning off the MOS transistors Q4a and Q4b, and a low-level signal is applied to the drive pulse supply terminals P2 and P8 thereby turning off the MOS transistors Q2a, Q2b, Q9a and Q9b. Then, a desired voltage (V16) is applied to the bias supply terminal P11, and a ground voltage is applied to the bias supply terminal P12.

As shown in FIG. 3(b), a high-level signal is applied to the drive pulse supply terminal P1 from the time t1 to a time t4, thereby turning on the MOS transistor Q1.

Then, as shown in FIG. 3(c), a high-level signal is applied to the drive pulse supply terminal P2 for a prescribed period from a time t2, thereby conducting the MOS transistors Q2a and Q2b. Thereby, the capacitor C2a (C2b) accumulates electric charges corresponding to the bias voltage value V16 in the time from the time t2 to the time t3, as shown in FIG. 3(d). That is, the electric charges are clamped.

On the other hand, as shown in FIG. 3(a), for an output of the pixel unit 11a (11b), an output voltage value (V0) in the initial state of the electric charge transfer unit is outputted from the time t1 to the time t3, and an output voltage value (V1) in which a signal electric charge caused in the photoelectric conversion element is electric charge-voltage converted is outputted from the time t3 to the time t4. Note that the part shown by an arrow is a signal output (V0-V1).

Then, when the output of the pixel units 11a, 11b becomes V1 at the time t3 (see FIG. 3(a)), a voltage between terminals of the capacitor C2a (C2b) is changed to V16' during the period to the time t4 corresponding to the capacity ratio between the capacitor C1a (C1b) and the capacitor C2a (C2b). The difference between the voltages V16 and V16' (V16-V16') is a signal component corresponding to the output from the photoelectric conversion element.

In this way, when accumulating of electric charges in the capacitor C2a (C2b) corresponding to the output of the photoelectric conversion element is completed, after the time t4, a low-level signal is applied to the drive pulse supply terminal P1, thereby turning off the MOS transistor Q1 as shown in FIG. 3(b), and then, a high-level signal is applied to the drive pulse supply terminal P7, thereby turning on the MOS transistor Q8, and the row scanning circuit unit 12 starts scanning. Thereby, as shown in FIG. 3(e), a high-level signal is applied to the gate of the MOS transistor Q6a at a time t5. Thereby, a voltage of the capacitor C2a is outputted to the signal output line L1 when the MOS transistor Q6a is on. Then, as shown in FIG. 3(f), a high-level signal is applied to the gate of the MOS transistor Q6b at a time t6. Thereby, when the MOS transistor Q6b is on, the voltage of the capacitor C2b is outputted to the signal output line L1.

In this way, voltages corresponding to the electric charges accumulated in the capacitors C2a and C2b are retrieved sequentially via the signal output line L1. At this time, a voltage value outputted to the signal output line L1 is a voltage corresponding to the capacity ratio between the capacitor C2a (C2b) and the diffusion capacitor C9.

Next, a description is given for the operation in the case where the pixel summing is performed.

Figure 4:
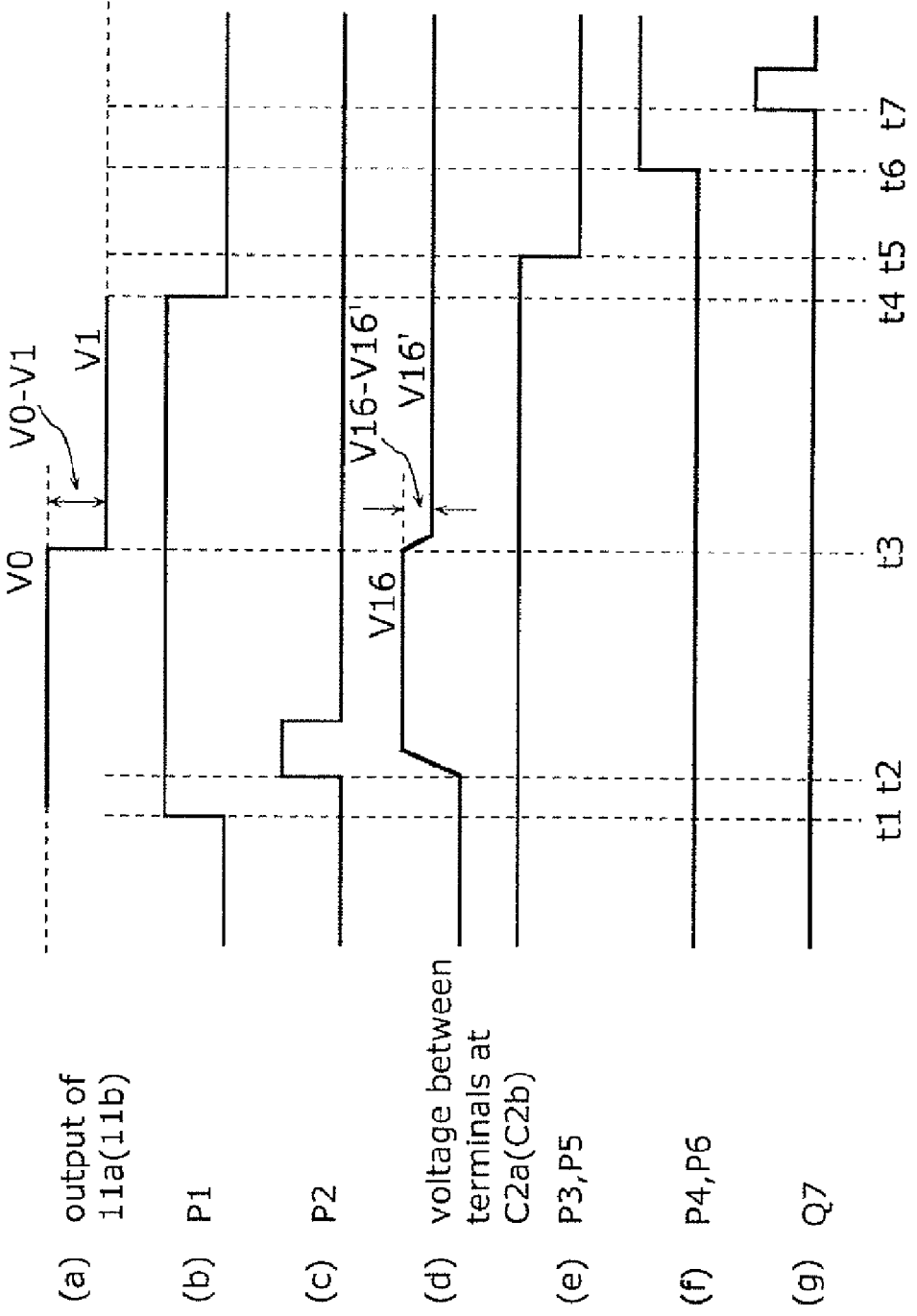
FIG. 4 is a diagram showing timings when pixel summing is performed in the solid-state imaging device 1 shown in FIG. 2.

FIG. 4 is a diagram showing timings when pixel summing is performed in the solid-state imaging device 1 shown in FIG. 2.

When the pixel summing is performed, different from the normal case, as preprocessing, for each frame, prior to the time t1, a high-level signal is first applied to the drive pulse supply terminal P2, P3, P5 and P6 thereby turning on the MOS transistors Q2a, Q2b, Q3a, Q3b, Q5a and Q5b, a low-level signal is applied to the drive pulse supply terminal P4 thereby turning off the MOS transistors Q4a and Q4b, and the same voltage is applied to the bias supply terminals P11 and P12 thereby setting a state where no electric charge exists in the capacitors C2a and C2b. Thereby, an offset voltage can be eliminated. The operation from the time t1 to the time t4 after discharging is same as the operation described above, so the description is not described again, and a description is given of an operation after the time t4.

Figure 5:
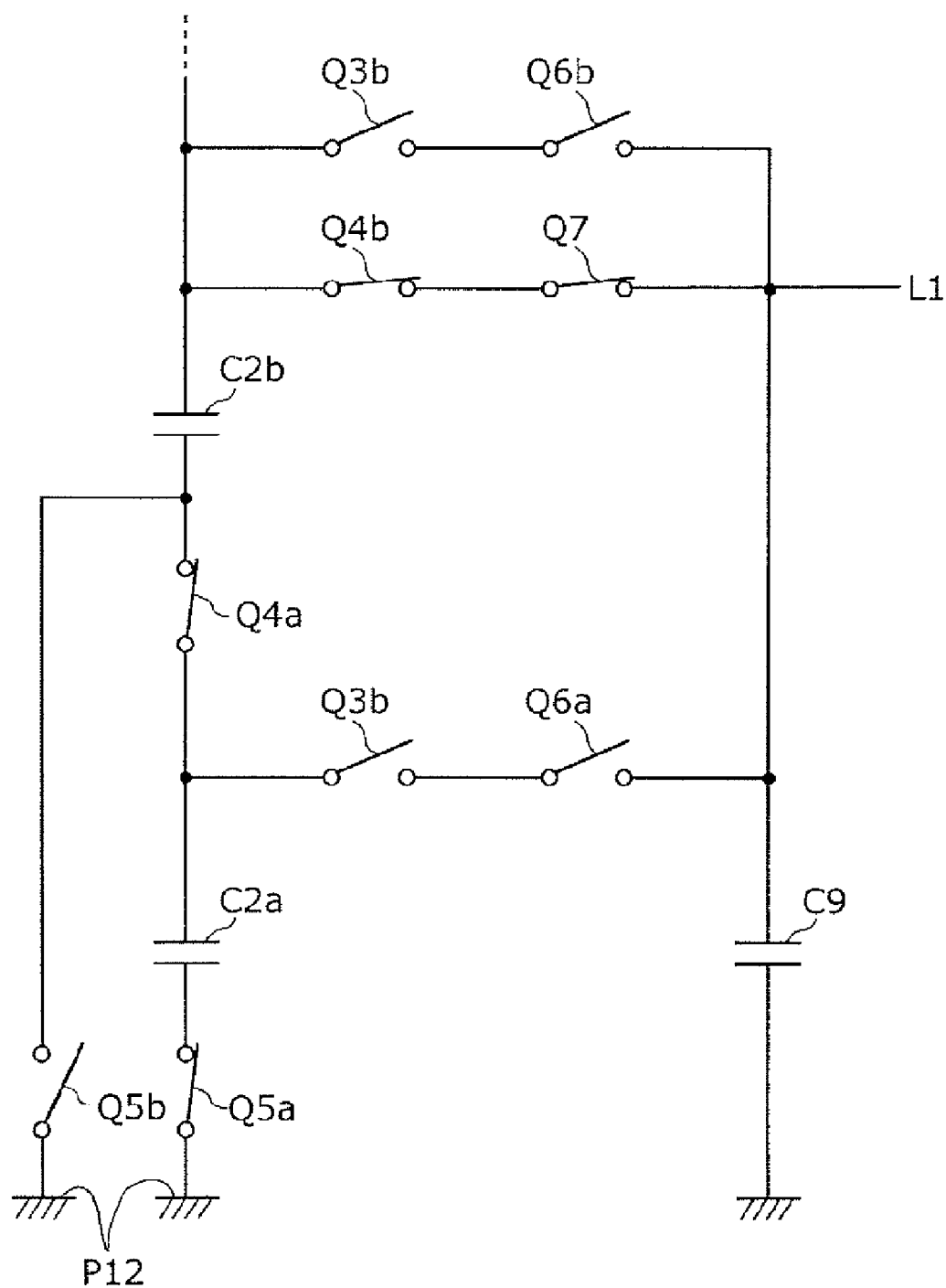
FIG. 5 is a diagram showing an equivalent circuit when pixel summing is performed in the solid-state imaging device 1 shown in FIG. 2.

As shown in FIG. 4(e), a low-level signal is applied to the drive pulse supply terminal P3 and P5 after a time t5, thereby turning off the MOS transistors Q3a, Q3b and Q5b. Then, as shown in FIG. 4(f), a high-level signal is applied to the drive pulse supply terminal P4 after a time t6, thereby turning on the MOS transistors Q4a and Q4b. Thereby, the capacitors C2a and C2b are connected in series in this state. That is, as shown in FIG. 5, the bias supply terminal P12, the MOS transistor Q5a, the capacitor C2a, the MOS transistor Q4a, the capacitor C2b and the MOS transistor Q4b are connected in series. Thereby, a voltage value obtained by summing the respective terminal voltages of the capacitor C2a and the capacitor C2b is applied to the drain of the MOS transistor Q7.

When a low-level signal is applied to the drive pulse supply terminal P7, thereby turning off the MOS transistors Q8a and Q8b, and a high-level signal is applied to the drive pulse supply terminal P8, thereby turning on the MOS transistors Q9a and Q9b, and the row scanning circuit unit 12 starts scanning in this state, a high-level signal of the first stage (m1) of the row scanning circuit unit is applied to the gate of the MOS transistor Q7 via the MOS transistor Q9a at a time t7 as shown in FIG. 4(g), thereby turning on the MOS transistor Q7.

Figure 6:
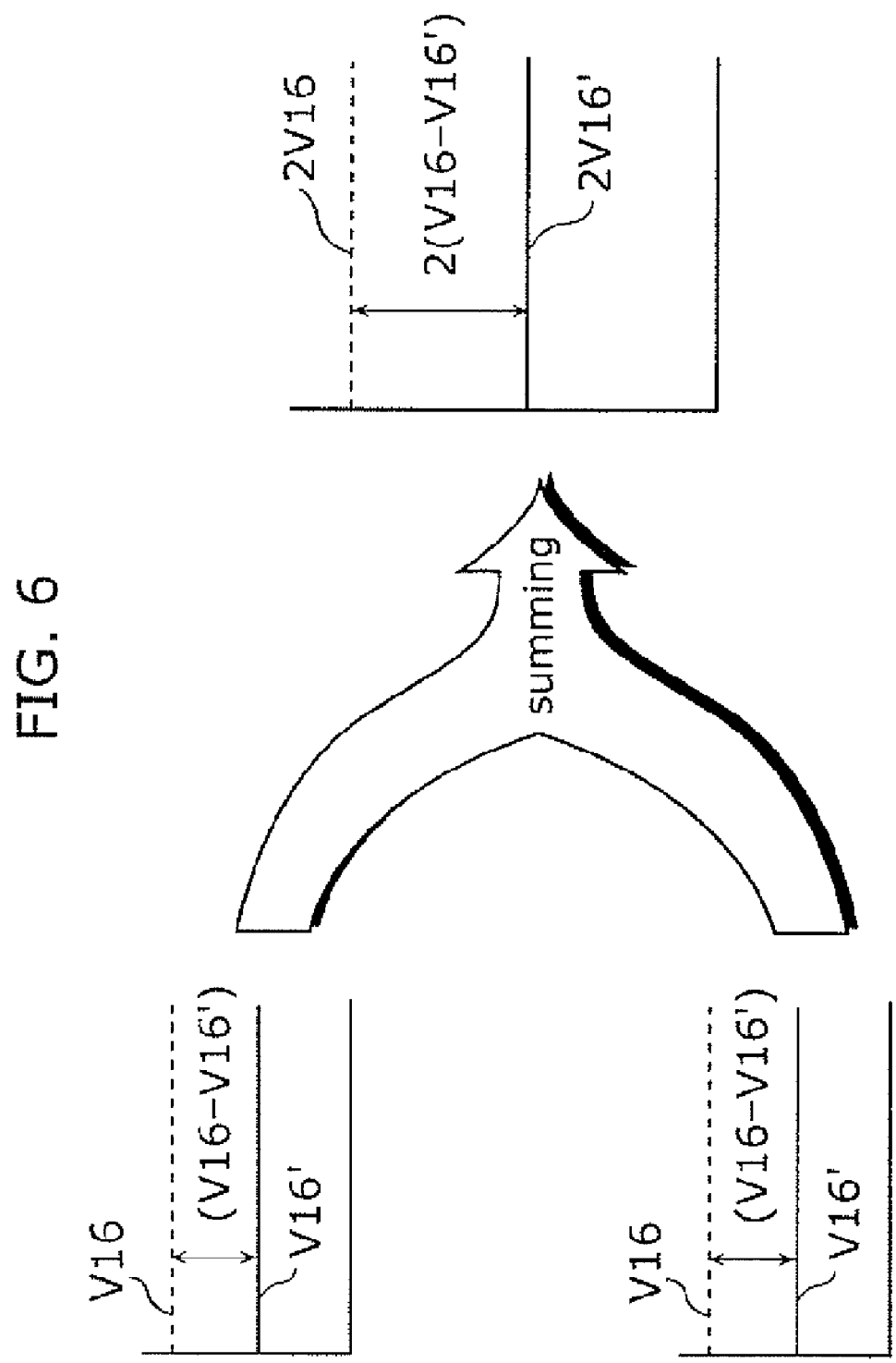
FIG. 6 is a diagram showing the pixel summing operation.

Thereby, as shown in FIG. 6, a voltage value obtained by summing the voltage of the capacitor C2a and the terminal voltage of the capacitor C2b is outputted to the signal output line L1.

Here, since the diffusion capacitor C9 exists in the signal output line L1, the voltage value obtained by summing the voltage of the capacitor C2a and the terminal voltage of the capacitor C2b, and a voltage corresponding to the capacity ratio to the diffusion capacitor C9 are outputted practically.

Now, it is assumed that the capacity value of the capacitors C2a and C2b is Ct, the voltage of the capacitors C2a and C2b is Vt, the capacity value of the diffusion capacitor C9 is Co, and the voltage of the signal output line L1 is V0. Assuming that the voltage of the signal output line L1 is k×Vt (k times Vt) and Ct=C0, in the conventional case without the pixel summing, a signal value to be outputted to the signal output line L1 is ((2+k)/(1+2))×Vt. In the case of the pixel summing of the present invention, a signal value to be outputted to the signal output line L1 is (2×(1+k)/(1+2))×Vt. Assuming K=1, a ⁴⁄₃-fold effect of the pixel summing is achieved.

Although, in the first embodiment described above, the case of summing signals of two photoelectric conversion elements in a row direction has been described as an example, it is possible to sum signals three or more photoelectric conversion elements in a row direction by developing the technique described above. If the capacity of a accumulation circuit is N, in the conventional case without the pixel summing, a signal value to be outputted to the signal output line L1 is ((N+k)/(1+N))×Vt, and in the case of the present invention performing the pixel summing, a signal value to be outputted to the signal output line L1 is (N×(1+k)/(1+N))×Vt. Assuming k=1, a 2×N/(1+N)-fold effect of the pixel summing is achieved.

Further, since the MOS transistor Q5a is always in a conduction state, the MOS transistor Q5a and the drive pulse supply terminal P6 may be omitted, and the bias supply terminal P12 may be directly connected with a terminal of the capacitor C2a, where the terminal is far from the photoelectric conversion element.

Second Embodiment

Next, a description is given of another solid-state imaging device according to the present invention.

Figure 7:
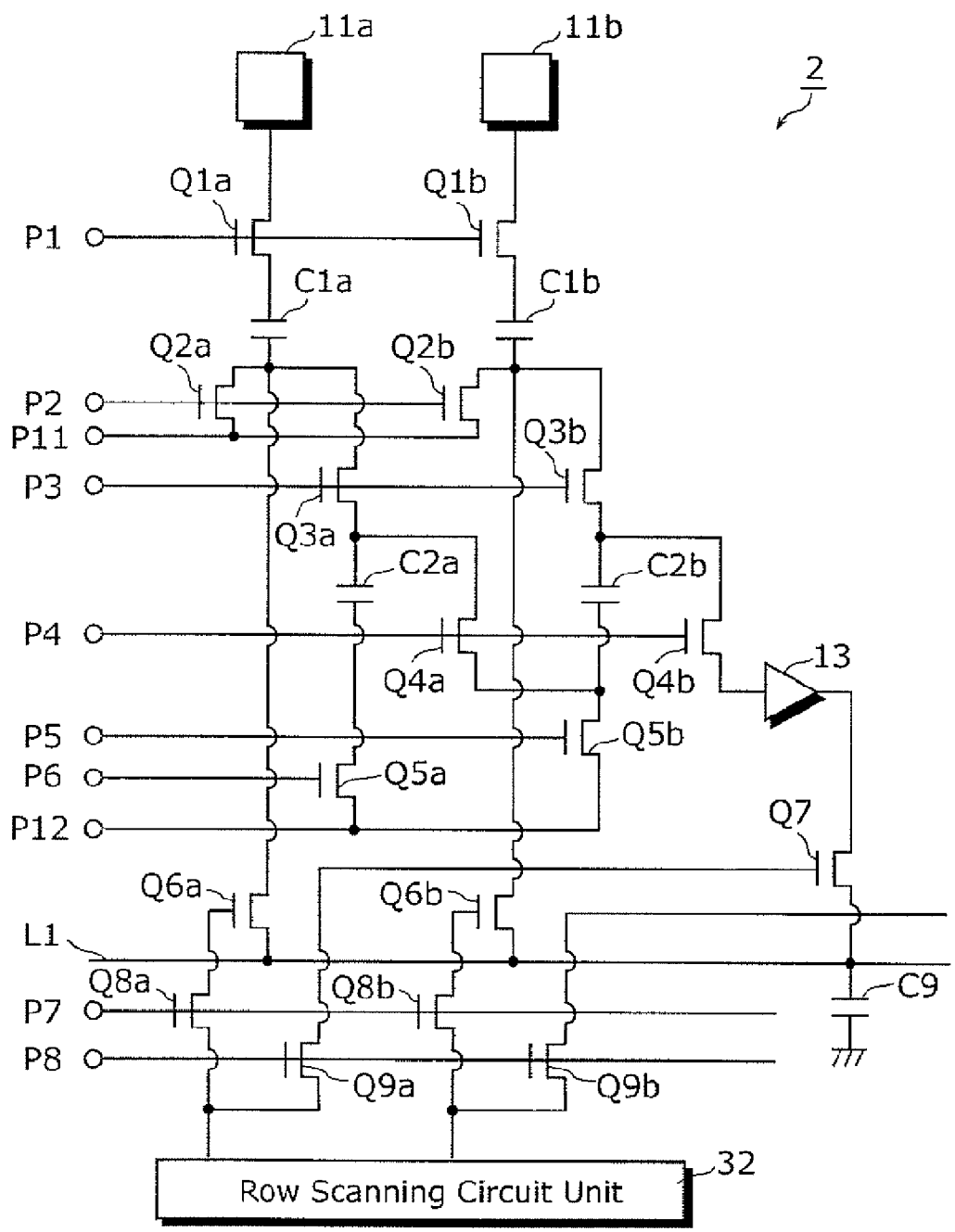
FIG. 7 is a circuit diagram showing the configuration of a solid-state imaging device according to a second embodiment of the present invention.

FIG. 7 is a circuit diagram showing the configuration of a solid-state imaging device according to the second embodiment of the present invention.

Note that since a signal value outputted to the signal output line L1 is divided with the diffusion capacitor C9 in the solid-state imaging device 1 as described above, a loss is caused.

Therefore, the solid-state imaging device 2 according to the second embodiment is configured to further include a high input impedance circuit 13 connected between the source of the MOS transistor Q4b and the drain of the MOS transistor Q7, in addition to the configuration of the solid-state imaging device 1, as shown in FIG. 7.

As a result, the signal value outputted to the signal output line L1 will not be divided with the diffusion capacitor C9, so if two accumulation circuits having the configuration shown in FIG. 7 are provided, the value is 2×Vt, and if the N number of accumulation circuits are provided, the value is N×Vt, so a signal voltage in proportion to the number of accumulation circuits is outputted to the signal output line L1.

Figure 8:
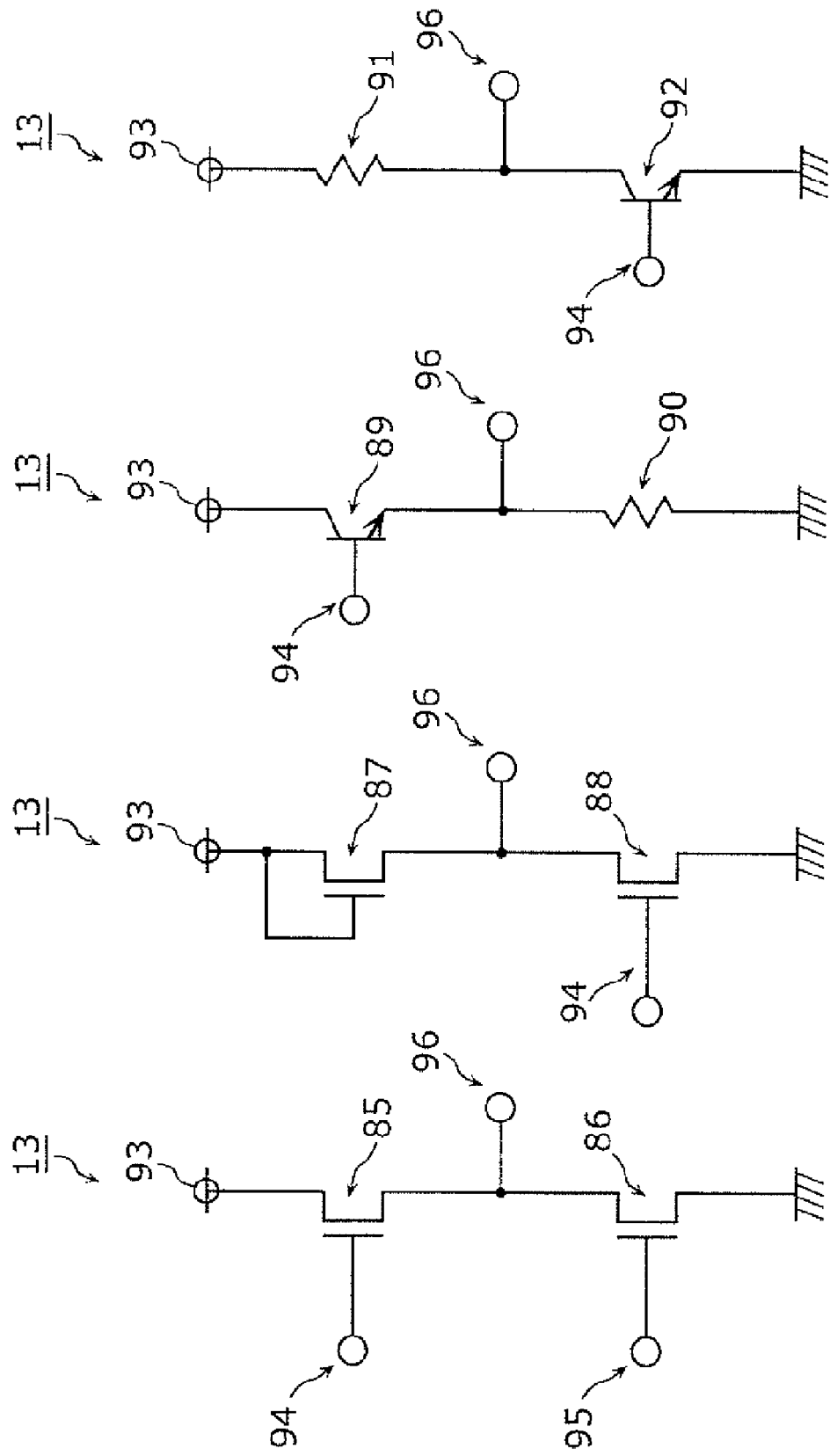
FIGS. 8A to 8D are diagrams showing examples of specific circuit configurations of a high input impedance circuit 13 shown in FIG. 7.

FIGS. 8A to 8D are diagrams each showing examples of specific circuit configurations of the high input impedance circuit 13 shown in FIG. 7, Note that FIG. 8A is a follower circuit using a MOS transistor, FIG. 8B is an inverter circuit using a MOS transistor, FIG. 8C is a follower circuit using a bipolar transistor, and FIG. 8D is an inverter circuit using a bipolar transistor.

The high input impedance circuit 13 shown in FIG. 8A includes MOS transistors 85 and 86 disposed between a power supply 93 and the ground, an input terminal 94, a bias terminal 95, and an output terminal 96, and is a follower circuit of high input impedance that an input is received by the gate of the MOS transistor 85.

The high input impedance circuit 13 shown in FIG. 8B is an inverter circuit including MOS transistors 87 and 88 disposed between the power supply 93 and the ground, the input terminal 94, and the output terminal 96. Here, the gate and the drain of the MOS transistor 87 are connected so as to form a load. An inverter circuit of high input impedance that an input is received by the gate of the MOS transistor 88 is constituted.

The high input impedance circuit 13 shown in FIG. 8C includes a bipolar transistor 89 disposed between the power supply 93 and the ground, a resistance 90, the input terminal 94, and the output terminal 96. A follower circuit of high input impedance that an input is received by the base of the bipolar transistor 89 is constituted.

The high input impedance circuit 13 shown in FIG. 8D includes a resistance 91 serving as a load and a bipolar transistor 92 disposed between the power supply 93 and the ground, the input terminal 94 and the output terminal 96. An inverter circuit of high input impedance that an input is received by the base of the bipolar transistor 92 is constituted.

Thereby, the high input impedance circuit 13 can be composed easily.

Third Embodiment

Next, a description is given of another solid-state imaging device of the present invention.

Figure 9:
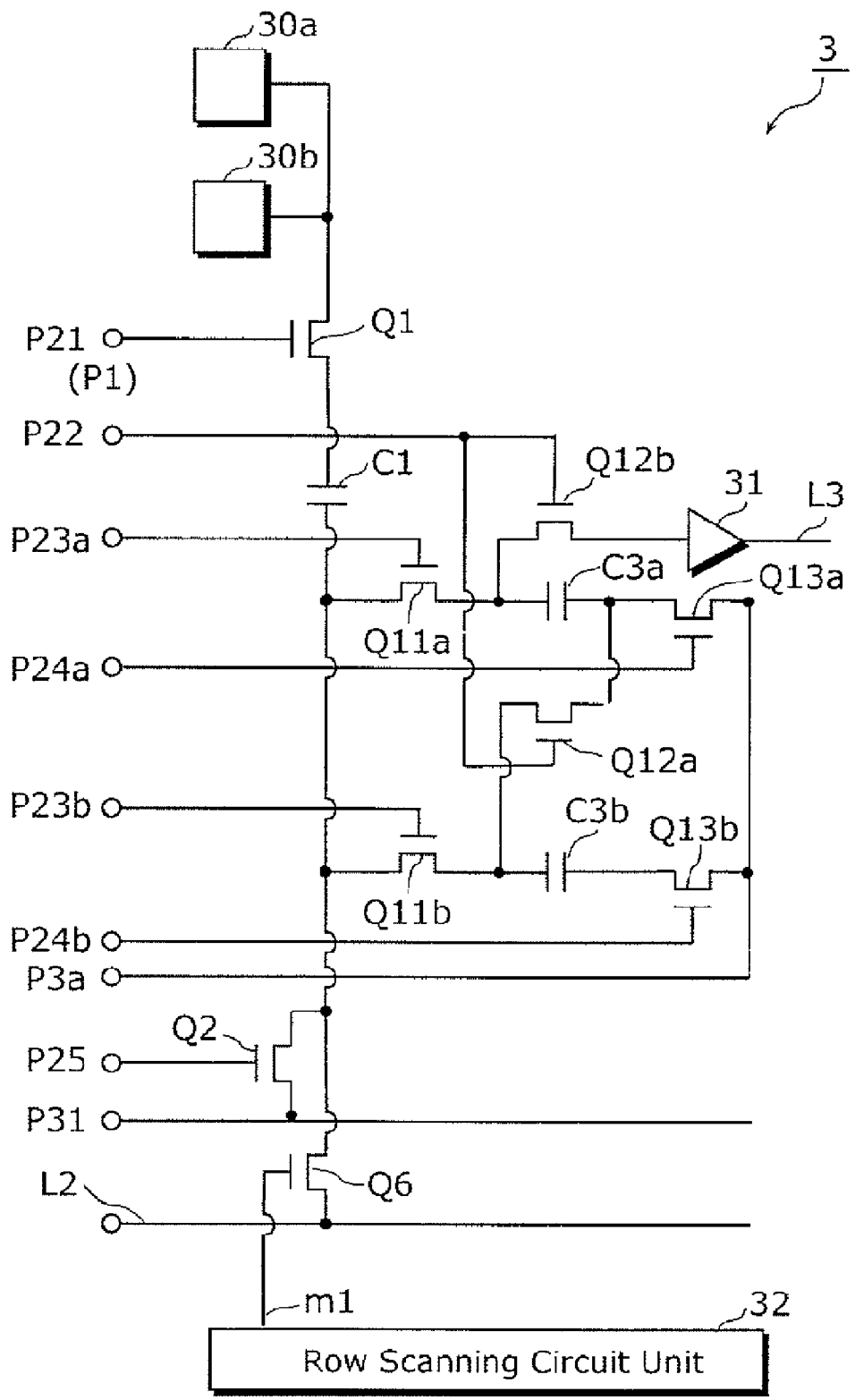
FIG. 9 is a circuit diagram showing the configuration of a solid-state imaging device according to a third embodiment of the present invention.

FIG. 9 is a circuit diagram showing the configuration of a solid-state imaging device according to the third embodiment of the present invention.

As shown in FIG. 9, the solid-state imaging device 3 is applied when there are two pixel units (photoelectric conversion elements) arranged in a column direction, which includes: pixel units 30a and 30b; MOS transistors Q1, Q2, Q6, Q11a, Q11b, Q12a, Q12b, Q13a and Q13b; capacitors C1, C3a and C3b; a buffer 31; a row scanning circuit unit 32; drive pulse supply terminals P21, P22, P23a, P23b, P24a, P24b and P25; bias supply terminals P31 and P32, signal output lines L2 and L3, and the like.

Each of the pixel units 30a and 30b includes a photoelectric conversion element, an electric charge transfer unit, an electric charge voltage conversion unit, a voltage amplification unit and the like. In FIG. 9, the detailed circuit configuration of the pixel units 30a and 30b is not shown.

The MOS transistors Q1, Q2, Q11a, Q11b, Q12a, Q12b, Q13a, Q13b and Q6 serve as switch circuits. Each of the MOS transistors Q1, Q2, Q11a, Q11b, Q12a, Q12b, Q13a, Q13b and Q6 performs switching operation in which conduction forms an on state and non-conduction forms an off state.

The capacitor C1 transmits a voltage.

The capacitors C3a and C3b serve as accumulation circuits.

The elements with "a" and "b" in the reference numerals in FIG. 9 are in association with the pixel units 30a and 30b, respectively. The following is described mainly a series of elements with the "a".

The drain of the MOS transistor Q1 is connected with outputs of the pixel units 30a and 30b, the source thereof is connected with the capacitor C1, and the gate thereof is connected with the drive pulse supply terminal P21.

The drain of the MOS transistor Q2 is connected with the capacitor C1, the source thereof is connected with the bias supply terminal P31, and the gate thereof is connected with the drive pulse supply terminal P25.

The drain of the MOS transistor Q11a is connected with the capacitor C1, the source thereof is connected with the capacitor C3a, and the gate thereof is connected with the drive pulse supply terminal P23a. On the other hand, the drain of the MOS transistor Q11b is connected with the capacitor C1, the source thereof is connected with the capacitor C3b, and the gate thereof is connected with the drive pulse supply terminal P23b.

The drain of the MOS transistor Q13a is connected with a terminal of the capacitor C3a, where the terminal is far from the photoelectric conversion element. The source of the MOS transistor Q13a is connected with the bias supply terminal P32, and the gate of the MOS transistor Q13a is connected with the drive pulse supply terminal P24a. On the other hand, the drain of the MOS transistor Q13b is connected with a terminal of the capacitor C3b, where the terminal is far from the photoelectric conversion element. The source of the MOS transistor Q13b is connected with the bias supply terminal P32, and the gate of the MOS transistor Q13b is connected with the drive pulse supply terminal P24b.

The drain of the MOS transistor Q6 is connected with the capacitor C1, the source thereof is connected with the signal output line L2, and the gate thereof is connected with the signal output line m1 of the row scanning circuit unit 32.

The drain of the MOS transistor Q12a is connected with a terminal of the capacitor C3a, where the terminal is far from the photoelectric conversion element. The source of the MOS transistor Q12a is connected with a terminal of the capacitor C3b, where the terminal is near to the photoelectric conversion element. The gate of the MOS transistor Q12a is connected with the drive pulse supply terminal 22. On the other hand, the drain of the MOS transistor Q12b is connected with a terminal of the capacitor C3a, where the terminal is near to the photoelectric conversion element. The source of the MOS transistor Q12b is connected with the input of the buffer 31, and the gate of the MOS transistor Q12b is connected with the drive pulse supply terminal P22.

Figure 10:
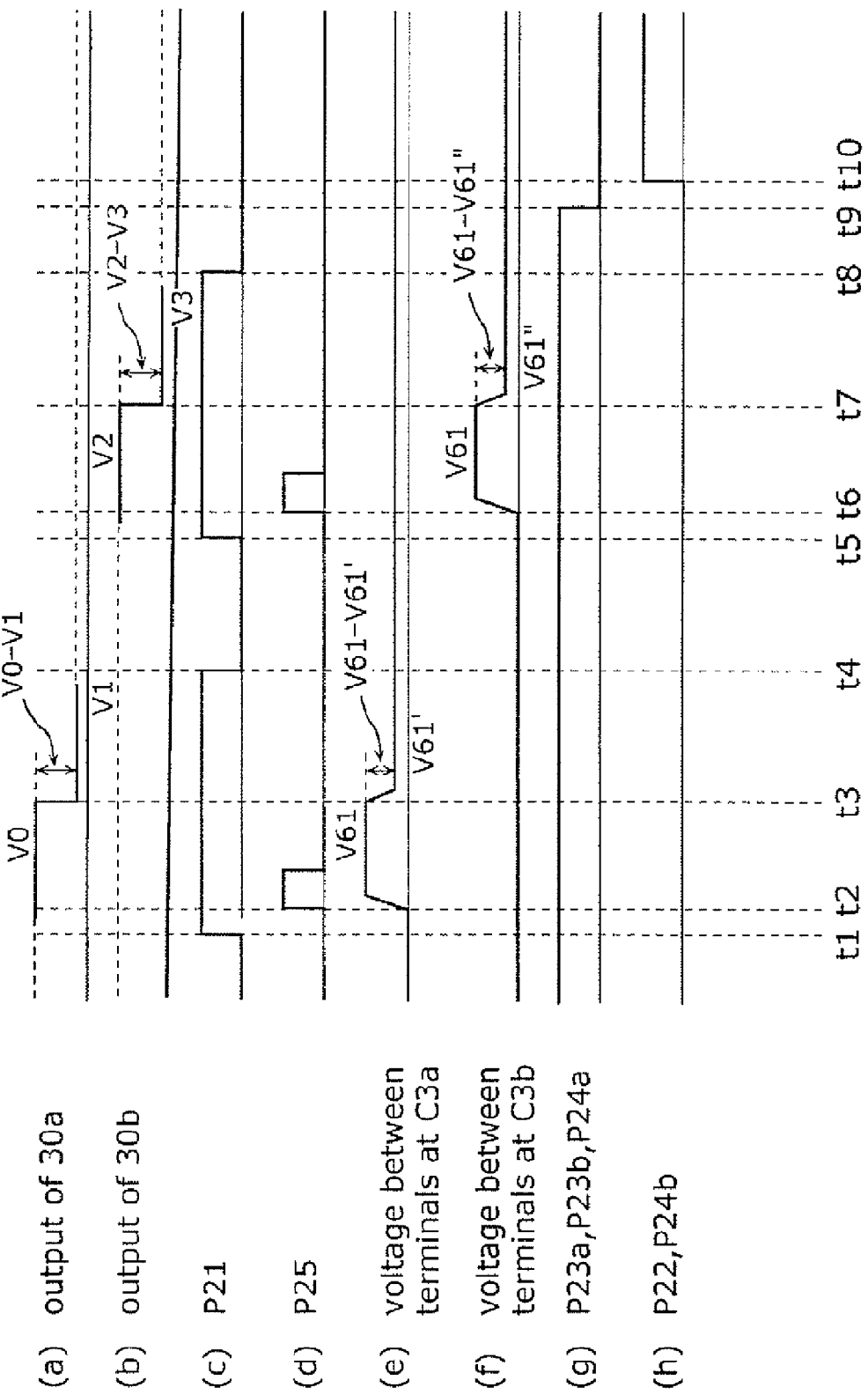
FIG. 10 is a diagram showing operation timings when pixel summing is performed in the solid-state imaging device 3.

FIG. 10 is a diagram showing operation timings when pixel summing is performed in the solid-state imaging device 3.

Prior to a time t1, as preprocessing, a high-level signal is first applied to the drive pulse supply terminals P23a, P23b, P24a, P24b and P25, thereby turning on the MOS transistors Q11a, Q11b, Q13a, Q13b and Q2, and a low-level signal is applied to the drive pulse supply terminal P22, thereby turning off the MOS transistors Q12a and Q12b. Thereby, the capacitors C3a and C3b are connected between the bias supply terminals P32 and P31. Then, by applying the same voltage to the bias supply terminals P32 and P31, a state where no electric charge exists in the capacitors C3a and C3b is set. Then, after turning off the MOS transistor Q2 by supplying a low-level signal to the drive pulse supply terminal P25, a desired voltage (V61) is applied to the bias supply terminal P31 and a ground voltage is applied to the bias supply terminal P32. Thereby, charging to the capacitors C3a and C3b is prepared.

Then, by supplying a high-level signal to the drive pulse supply terminals P23a, P23b and P24a, the MOS transistors Q11a, Q11b and Q13a are turned on, and by supplying a low-level signal to the drive pulse supply terminals P22 and P23b, the MOS transistor Q12a and Q12b are turned off.

When the pre-preparation is completed, first, a high-level signal is applied to the drive pulse supply terminal P21 from a time t1 to a time t4 as shown in FIG. 10(c), thereby turning on the MOS transistor Q1.

Then, by supplying a high-level signal to the drive pulse supply terminal P25 for a prescribed period from a time t2 as shown in FIG. 10(d), the MOS transistor Q2 is turned on. In the time from the time t2 to the time t3, the capacitor C3a accumulates electric charges corresponding to the voltage value V61.

As shown in FIG. 10(a), the pixel unit 30a outputs an output voltage value (V0) in the initial state of the electric charge voltage conversion unit from the time t1 to the time t3, and outputs an output voltage value (V1) obtained by performing electric charge-voltage conversion to a signal charge caused in the photoelectric conversion element from the time t3 to the time t4. Here, the part shown by an arrow is a signal output (V0-V1). This operation is same as that of the first embodiment.

When the output of pixel unit 30a becomes V1 as described above, in between the terminals of the capacitor C3a, the output is changed to V61' corresponding to the capacity ratio between the capacitor C1 and the capacitor C3a in the time from the time t3 to the time t4, as shown in FIG. 10(a). The difference between V61 and V61' (V61−V61') is a signal component corresponding to an output from the photoelectric conversion element.

When accumulating of voltage in the capacitor C3a corresponding to the output from the photoelectric conversion element is completed, a low-level signal is applied to the drive pulse supply terminal P21 from the time t4 to the time t5 as shown in FIG. 10(c), thereby turning off the MOS transistor Q1.

Then, as shown in FIG. 10(d), a high-level signal is applied to the drive pulse supply terminal P21 from a time t5 to a time t8, thereby turning on the MOS transistor Q1 again.

Then, as shown in FIG. 10(d), a high-level signal is applied to the drive pulse supply terminal P25 for a prescribed period from the time t6, thereby turning on the MOS transistor Q2 again. In the time from the time t6 to the time t7, the capacitor C3b accumulates electric charges corresponding to the voltage value V61.

As shown in FIG. 10(b), the pixel unit 30b outputs an output voltage value (V2) in the initial state of the electric charge voltage conversion unit from the time t6 to the time t7, and outputs an output voltage value (V3) obtained by performing electric charge-voltage conversion to a signal charge caused in the photoelectric conversion element from the time t7 to the time t8. Here, the part shown by an arrow is a signal output (V2-V3). This operation is same as that of the first embodiment.

In this way, when the output of the pixel unit 30b becomes V2, the voltage between terminals of the capacitor C3b is changed to V61" in the time from the time t7 to the time t8, as shown in FIG. 10(f). Here, the difference between V61 and V61" (V61−V61") is a signal component corresponding to the output of the photoelectric conversion element.

When accumulating of voltage in the capacitor C3b corresponding to the output from the photoelectric conversion element is completed, the MOS transistor Q1 is turned off by supplying a low-level signal to the drive pulse supply terminal P21 from the time t8 to a time t9, as shown in FIG. 10(c). Thereby, output signals of the pixel units 30a and 30b arranged in a column direction are accumulated in the capacitors C3a and C3b from the time t1 to the time t9.

When accumulating of the signals in the capacitors C3a and C3b corresponding to the outputs of the pixel units 30a and 30b is completed, the MOS transistors Q11a, Q11b and Q13a are turned off by supplying a low-level signal to the drive pulse supply terminals P23a, P23b and P24a at the time t9, as shown in FIG. 10(g). Then, as shown in FIG. 10(h), the MOS transistors Q12a, Q12b and Q13b are turned on by supplying a high-level signal to the drive pulse supply terminal P22 at a time t10. In this state, the capacitors C3a and C3b are connected in series.

Figure 11:
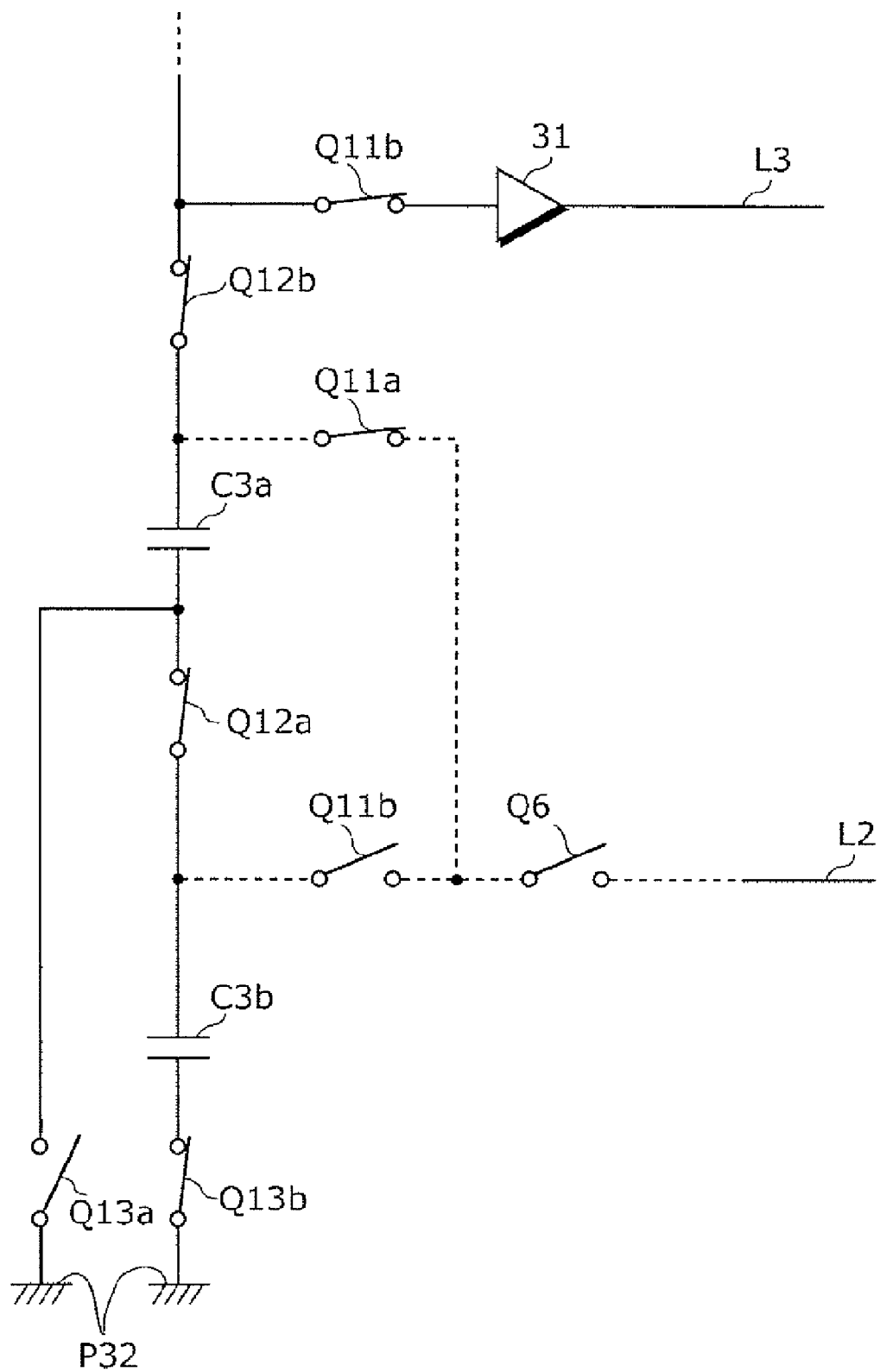
FIG. 11 is a diagram showing an equivalent circuit when pixel summing is performed in the solid-state imaging device 3 shown in FIG. 9.

In other words, as shown in FIG. 11, the bias supply terminal P32, the MOS transistor Q13b, the capacitor C3b, the MOS transistor Q12a, the capacitor C3a, the MOS transistor Q12b up to the input side of the buffer 31 are connected in series. Thereby, a voltage value obtained by summing respective terminal voltages of the capacitor C3a and the capacitor C3b is applied to the input of the buffer 31, and the voltage value obtained by summing the terminal voltages of the capacitor C3a and the capacitor C3b is outputted from the signal output line L3 connected with the buffer 31.

Then, the output of the signal output line L3 is outputted to the signal output line L2 thereby summing signals of the pixel units in a row direction in the same manner as described in the first embodiment, although the circuits are not shown in FIG. 9 and the timings are not shown in FIG. 10.

Note that although the case of summing signals of the two photoelectric conversion elements in a column direction has been described exemplary in the third embodiment described above, it is also possible to sum signals of three or more photoelectric conversion elements by developing the above-described technique.

Fourth Embodiment

Next, a description is given of another solid-state imaging device according to the present invention.

Figure 12:
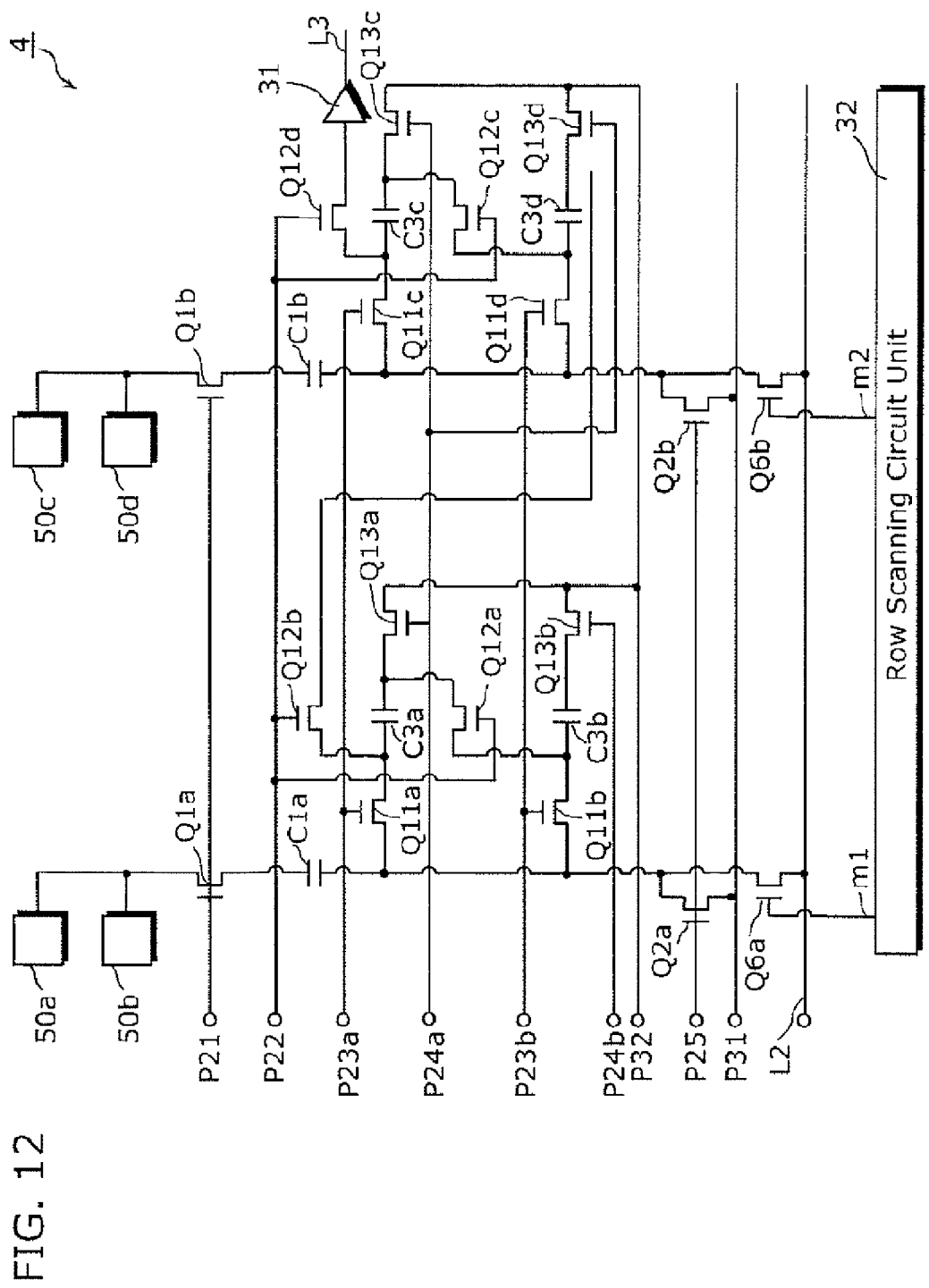
FIG. 12 is a circuit diagram showing a solid-state imaging device according to a fourth embodiment of the present invention.

FIG. 12 is a circuit diagram showing a solid-state imaging device according to the fourth embodiment of the present invention.

Note that FIG. 12 shows the case of four photoelectric conversion elements arranged in a row direction and in a column direction (two elements in a row direction, two elements in a column direction).

The solid-state imaging device 4 is configured by combining the solid-state imaging device 1 and the solid-state imaging device 3 described above. As shown in FIG. 12, the solid-state imaging device 4 includes the pixel units 30a, 30b, 30c and 30d, the MOS transistors Q1a, Q1b, Q2a, Q2b, Q11a, Q11b, Q11c, Q11d, Q12a, Q12b, Q12c, Q12d, Q13a, Q13b, Q13c, Q13d, Q6a and Q6b, the capacitors C1a and C1b for transmitting outputs of the pixel units 30a, 30b, 30c and 30d, the capacitors C3a, C3b, C3c and C3d for accumulating electric charges corresponding to outputs of the pixel units 30a, 30b, 30c and 30d, the buffer 31, the row scanning circuit unit 32, the drive pulse supply terminals P21, P22, P23a, P23b, P24a, P24b and P25, the bias supply terminal P31 and P32, the signal output lines L2 and L3 and the like.

Next, a description is given of the operation of the solid-state imaging device 4. Here, a description is given from a state where operations same as those in the first to third embodiments are performed, and after setting the same electric potential to both terminals of the capacitors C3a, C3b, C3c and C3d respectively, signals of the pixel unit 30a, the pixel unit 30b, the pixel unit 30c and the pixel unit 30d are accumulated in the capacitors C3a, C3b, C3c and C3d, respectively.

A low-level signal is applied to the drive pulse supply terminals P23a, P23b and P24a, thereby turning off the MOS transistors Q11a, Q11b, Q11c, Q11d, Q13a, Q13c and Q13d. Then, a high-level signal is applied to the drive pulse supply terminals P22 and P24b, thereby turning on the MOS transistors Q12 and Q13b. In this state, the capacitors C3a, C3b, C3c and C3d are connected in series. That is, the bias supply terminal P32, the MOS transistor Q13b, the capacitor C3b, the MOS transistor Q12a, the capacitor C3a, the MOS transistor Q12b, the capacitor C3d, the MOS transistor Q12c, the capacitor C3c, the MOS transistor Q12d up to the input side of the buffer 31 are connected in series.

A voltage value obtained by summing respective inter-terminal voltages of the capacitors C3a, C3b, C3c and C3d is applied to the input of the buffer 31, and the voltage value obtained by summing the inter-terminal voltages of the capacitors C3a, C3b, C3c and C3d is outputted from to the signal output line L3.

Then, the output of the signal output line L3 is outputted to the signal output line L2 thereby summing signals of the pixel units in a row direction and a column direction simultaneously, in the same manner as described in the first embodiment, although the circuit to which the output of the signal output line L3 is outputted is not shown in FIG. 12.

Although the case of summing signals of four photoelectric conversion elements, that is, two elements in each of the row direction and the column direction, has been described exemplary above, it is also possible to sum signals of three or more photoelectric conversion elements in each of the row direction and the column direction by developing the above technique.

Fifth Embodiment

Next, a description is given of still another solid-state imaging device of the present invention.

Figure 13:
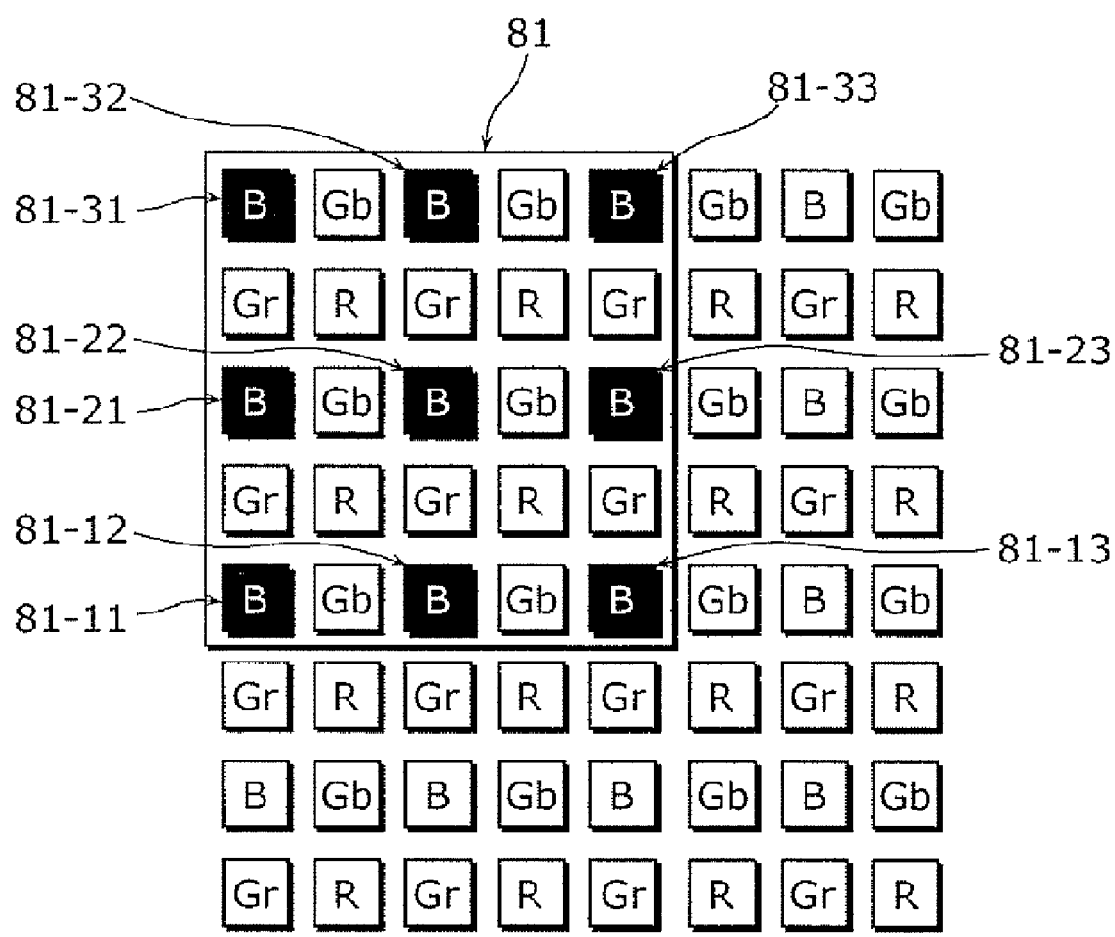
FIG. 13 is a diagram showing a solid-state imaging device in which color filters are provided on different photoelectric conversion elements arranged in rows and columns in a fifth embodiment of the present invention.

FIG. 13 is a diagram showing a solid-state imaging device having color filters on different photoelectric conversion elements arranged in rows and columns according to the fifth embodiment of the present invention. In this case, a pattern of 64 pixels included in an area of eight rows and eight columns is shown. The color filters are in a Bayer pattern of R, B, Gr and Gb. The Bayer pattern is so configured that in color filters corresponding to the primary colors of light consisting of blue (B), green (G) and red (R), G are arranged in a checkered pattern and R and B are arranged in linear sequence. Thereby, color separation is fine and conversion processing to RGB signals is not required, so an image excellent in color reproducibility can be obtained.

Here, a description is given of the case of color filters B as an example of the pixel summing.

A pixel summing unit 81 includes 9 pixels with color filters B for three rows and three columns. These pixels are indicated as 81-11, 81-12, 81-13, 81-21, 81-22, 81-23, 81-31, 81-32 and 81-33.

After accumulating the signal voltages of the nine pixels in the capacities of the accumulation circuits corresponding to the nine pixels, the signal voltages of the nine pixels can be summed by connecting the respective capacities in series.

In the solid-state imaging devices 1 and 2 in the first and second embodiments, it is only necessary to sum signals of the three pixels 81-11, 81-12 and 81-13, sum signals of the three pixels 81-21, 81-22 and 81-23, and sum signals of the three pixels 81-31, 81-32 and 81-33 in a row direction, respectively. Then, the summed pixels are further summed all together in a column direction.

Further, in a solid-state imaging device performing the pixel signal summing in a column direction, as the solid-state imaging device 3 of the third embodiment, it is only necessary to sum signals of the three pixels 81-11, 81-21 and 81-31, sum signals of the three pixels 81-12, 81-22 and 81-32, and sum signals of the three pixels 81-13, 81-23 and 81-33 in a column direction, respectively. Then, the summed pixels are further summed all together in a row direction.

Further, in the fourth embodiment, it is only necessary to sum all of the nine pixels 81-11, 81-12, 81-13, 81-21, 81-22, 81-23, 81-31, 81-32 and 81-33 at the same time.

By producing a camera using the solid-state imaging device of the first to fifth embodiments of the present invention, the pixel summing with less sensitivity lowering becomes possible.

Note that although capacitors are used as accumulation circuits in the first to fourth embodiments, analog memories, signal delay lines or the like may be used.

Further, although MOS transistors are used as switch circuits in the first to fourth embodiments, other switches such as analog switches can be used.

Further, a camera may be configured by using the solid-state imaging device described above.

Sixth Embodiment

Figure 14:
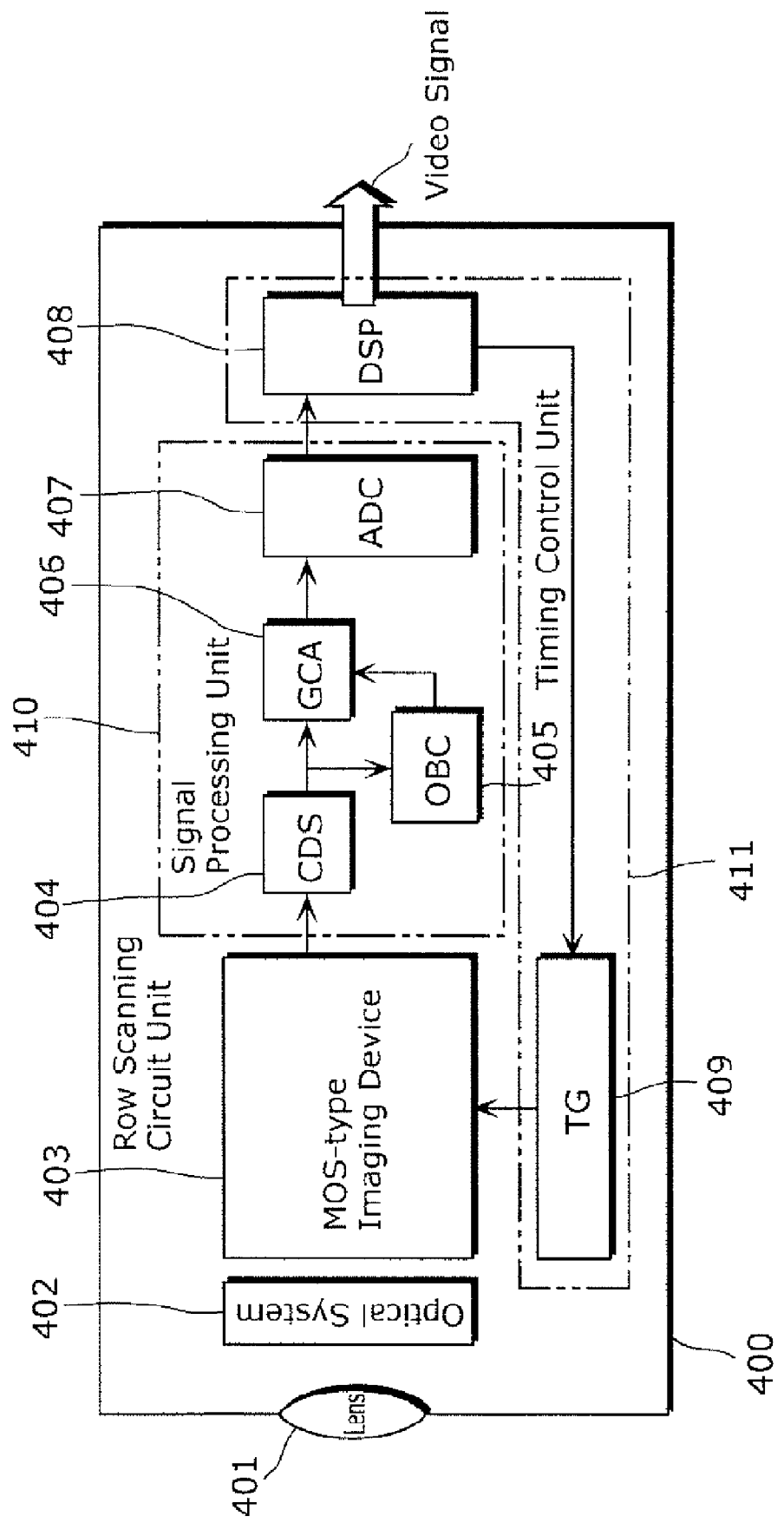
FIG. 14 is a diagram showing the configuration of a camera using the solid-state imaging device of the first to fifth embodiments mentioned above.

FIG. 14 shows a structure of a camera using the solid-state imaging devices according to the first to fifth embodiments.

As shown in FIG. 14, a camera 400 includes: a lens 401 for imaging an optical image of an object to the imaging device; an optical system 402 such as a mirror and a shutter for optical processing of the optical image transmitted through the lens 401; a MOS-type imaging device 403 equipped with the above-described solid-state imaging device; a signal processing unit 410; a timing control unit 411; and the like. The timing control unit 411 includes: a CDS circuit 404 for taking a difference between signals of field through outputted from the MOS-type imaging device 403 and outputting signals; an OB clamping circuit 405 for detecting OB level signals outputted from the CDS circuit 404; a GCA 406 for adjusting a gain which is a difference between an OB level and an effective pixel signal level; an ADC 407 for converting analog signals outputted from the GCA 406 into digital signals; and the like. The timing control unit 411 includes: a DSP 408 for performing signal processing for the digital signals outputted from the ADC 407 and controlling driving timings; and a TG 409 for generating various driving pulses at various timings in the MOS-type imaging device 403 under the control of the DSP 408; and the like.

With the camera 400 having the above structure, it is possible to obtain high-quality image using the solid-state imaging device by which sensitivity is lowered and signals of pixels regarding the same color is summed to be outputted, by the MOS-type imaging device 403 realized by the above-described solid-state imaging device.

Note that the camera according to the sixth embodiment has the solid-state imaging device, the lens, and the like as described in the above embodiments, and has the same structure, operations, and effect as described in the above embodiments.

INDUSTRIAL APPLICABILITY

The solid-state imaging device of the present invention is effective for pixel summing utilized for a moving picture function used in a digital camera or the like, and is suitable for a camera using the same. For example, it is suitable for a portable telephone with a camera, a camera provided to a laptop PC, a camera unit connected with information processing equipment or the like, besides an image sensor and a digital still camera, for example.

The invention claimed is:

1. A solid-state imaging device having a plurality of pixel units each of which includes a photoelectric conversion element, said solid-state imaging device comprising:
    a first capacitor which has a first terminal connected to a first pixel unit among said plurality of pixel units and accumulates electric charges corresponding to a signal outputted from said photoelectric conversion element of said first pixel unit;
    a second capacitor which has a first terminal connected to a second pixel unit among said plurality of pixel units and accumulates electric charges corresponding to a signal outputted from said photoelectric conversion element of said second pixel unit;
    a first MOS transistor disposed between said first pixel unit and the first terminal of said first capacitor;
    a second MOS transistor disposed between said second pixel unit and the first terminal of said second capacitor;
    a third MOS transistor disposed between a second terminal of said first capacitor and a second terminal of said second capacitor;
    a fourth MOS transistor disposed between said third MOS transistor and the second terminal of said second capacitor;
    a fifth MOS transistor disposed between a point at which said first MOS transistor and the first terminal of said first capacitor are connected and a point at which said fourth MOS transistor and the second terminal of said second capacitor are connected;
    a terminal (i) which is connected to a point at which said third MOS transistor and said fourth MOS transistor are connected, and (ii) to which a bias voltage is applied;
    a high input impedance circuit which has an input terminal connected between said second MOS transistor and the first terminal of said second capacitor;
    a sixth MOS transistor disposed between the input terminal of said high input impedance circuit and a point at which said second MOS transistor and the first terminal of said second capacitor are connected; and
    an output signal line connected to an output terminal of said high input impedance circuit.

2. The solid-state imaging device according to claim 1, wherein said high input impedance circuit is one of a follower circuit and an inverter circuit.

3. The solid-state imaging device according to claim 2, wherein each of said follower circuit and said inverter circuit includes one of a gate of a MOS transistor and a base of a bipolar transistor.

4. The solid-state imaging device according to claim 1, wherein each said first pixel unit of a plurality of first pixel units or each said second pixel unit of a plurality of second pixel units has a color filter of a same color.

5. The solid-state imaging device according to claim 4, wherein the color filter is in a Bayer pattern.

6. A camera having the solid-state imaging device of claim 1.

* * * * *